(12) United States Patent
Strashny et al.

(10) Patent No.: US 11,519,819 B2
(45) Date of Patent: Dec. 6, 2022

(54) SEAL TESTING SYSTEM

(71) Applicant: Caterpillar Global Mining LLC, Tucson, AZ (US)

(72) Inventors: Igor Strashny, Tucson, AZ (US); Andrew D. Hamilla, Tucson, AZ (US)

(73) Assignee: Caterpillar Global Mining LLC, Tucson, AZ (US)

( * ) Notice: Subject to any disclaimer, the term of this patent is extended or adjusted under 35 U.S.C. 154(b) by 282 days.

(21) Appl. No.: 16/697,477

(22) Filed: Nov. 27, 2019

(65) Prior Publication Data
US 2021/0156761 A1    May 27, 2021

(51) Int. Cl.
*G01M 13/005* (2019.01)
*G01N 3/56* (2006.01)

(52) U.S. Cl.
CPC .............. *G01M 13/005* (2013.01); *G01N 3/56* (2013.01)

(58) Field of Classification Search
CPC ................................................... G01M 13/005
USPC ............................................................ 73/52
See application file for complete search history.

(56) References Cited

U.S. PATENT DOCUMENTS

| 4,574,618 | A |   | 3/1986 | Anthony et al. |
| 5,814,717 | A | * | 9/1998 | Antonini ............. G01M 13/005 73/9 |
| 6,276,194 | B1 |  | 8/2001 | Vinton et al. |

| 2015/0233788 | A1 |   | 8/2015 | Cline et al. |
| 2016/0146681 | A1 | * | 5/2016 | Sun ..................... G01M 13/005 73/862.191 |
| 2017/0052086 | A1 | * | 2/2017 | Sarkissian ........... F16L 55/1108 |

(Continued)

FOREIGN PATENT DOCUMENTS

| CN | 202255794 U | 5/2012 |
| CN | 203163946 U | 8/2013 |
| CN | 203287198 U | 11/2013 |

(Continued)

OTHER PUBLICATIONS

He Haitao et al. Machine translation of CN205246336U. Published Dec. 2015. Translated Nov. 2021. (Year: 2015).*

(Continued)

*Primary Examiner* — Walter L Lindsay, Jr.
*Assistant Examiner* — PhilipMarcus T Fadul
(74) *Attorney, Agent, or Firm* — Bookoff McAndrews, PLLC (57) ABSTRACT

A seal testing system includes a drive system and a rotating shaft driven by the drive system. The system further includes a first seal testing subassembly including a first rotating member coupled to the rotating shaft, a first stationary member located adjacent the first rotating member, and a first test seal disposed between the rotating member and the stationary member at a first seal interface; and a second seal testing subassembly including a second rotating member coupled to the rotating shaft, a second stationary member located adjacent the second rotating member, and a second test seal disposed between the rotating member and the stationary member at a second seal interface. The system additionally includes a misalignment assembly coupled to the first and second stationary members to move the first and second stationary members the same distance to provide an equal misalignment at the first and second seal interface.

15 Claims, 8 Drawing Sheets

(56) References Cited

U.S. PATENT DOCUMENTS

2017/0089844 A1* 3/2017 Mohamed Salleh .................. G01N 21/95692

FOREIGN PATENT DOCUMENTS

| CN | 204286688 | | 4/2015 |
|---|---|---|---|
| CN | 205246336 | | 5/2016 |
| CN | 206920091 | U | 1/2018 |
| CN | 109580121 | A | 4/2019 |
| DE | 102010008801 | A1 | 8/2011 |

OTHER PUBLICATIONS

Written Opinion and International Search Report for International Patent Appln. No. PCT/US2020/061296, dated Mar. 5, 2021 (10 pgs).

* cited by examiner

SEAL TESTING SYSTEM

TECHNICAL FIELD

The present disclosure relates generally to testing systems, and more particularly to systems for testing machinery seals.

BACKGROUND

Seals used in machinery may encounter challenging environmental conditions that can lead to premature seal wear and seal failure. Short seal life and seal failure can be detrimental to the machine owner due to the cost and downtime associated with early seal replacement, and due to damage to the machine or safety problems that can result from a failed seal. Accordingly, there is a need to test seals to ensure that they provide the desired sealing and seal life. Validation of new seal designs to ensure proper sealing and seal life, however, can be a difficult and time intensive process. For example, such seal testing may require monitoring the seals in the field to ensure that the seals are being tested in the conditions that the seals will see in use. However, field testing has drawbacks. It may be logistically difficult to provide proper seal monitoring in the field, the repeatability of seal testing in the field may be difficult, and intermittent use of the machine in the field may result in a lengthy seal testing process.

Chinese Patent Publication No. CN109580121, entitled Multifunctional Sealing Performance Testing Experiment Platform, discloses a lab-based seal testing system for high liquid pressure environments, such as those found in a transmission system. The disclosed system induces torsional, axial, and/or radial vibrational loads on the tested sealing system. The '121 publication discloses various different testing protocols by varying the loads and pressures induced on the tested sealing system. While the '121 publication discloses a variable, lab-based seal testing system, it does not test multiple seal systems simultaneously, and is limited in the various conditions that can be induced on the seals during testing.

The seal testing system of the present disclosure may solve one or more of the problems set forth above and/or other problems in the art. The scope of the current disclosure, however, is defined by the attached claims, and not by the ability to solve any specific problem.

SUMMARY

According to a first aspect of the present disclosure, a seal testing system includes a drive system and a rotating shaft driven by the drive system. The system further includes a first seal testing subassembly including a first rotating member coupled to the rotating shaft, a first stationary member located adjacent the first rotating member, and a first test seal disposed between the rotating member and the stationary member at a first seal interface; and a second seal testing subassembly including a second rotating member coupled to the rotating shaft, a second stationary member located adjacent the second rotating member, and a second test seal disposed between the rotating member and the stationary member at a second seal interface. The system additionally includes a misalignment assembly coupled to the first and second stationary members to move the first and second stationary members the same distance to provide an equal misalignment at the first and second seal interface.

According to another aspect of the present disclosure, a seal testing system includes a tub for holding media, a drive system, and a rotating shaft driven by the drive system. The system further incudes a first seal testing subassembly including a first rotating member coupled to the rotating shaft, a first stationary member located adjacent the first rotating member, and a first test seal disposed between the rotating member and the stationary member at a first seal interface, the first seal interface being at least partially located in the tub; and a second seal testing subassembly substantially identical to the first seal testing subassembly, the second seal testing subassembly including a second rotating member coupled to the rotating shaft, a second stationary member located adjacent the second rotating member, and a second test seal disposed between the rotating member and the stationary member at a second seal interface, the second seal interface being at least partially located in the tub.

According to yet another aspect of the present disclosure, a method of testing seals includes loading a plurality of identical test seals into a plurality of seal testing subassemblies of a seal testing system; and selectively applying the same at least one seal wear parameter to each test seal simultaneously, the at least one seal wear parameter including: the same rotational load on each test seal; the same misalignment to each test seal; the same seal gap for each test seal; or the same egress media to each test seal.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "generally," "substantially," and "approximately" are used to indicate a possible variation of ±10% in the stated value.

Figure 1:
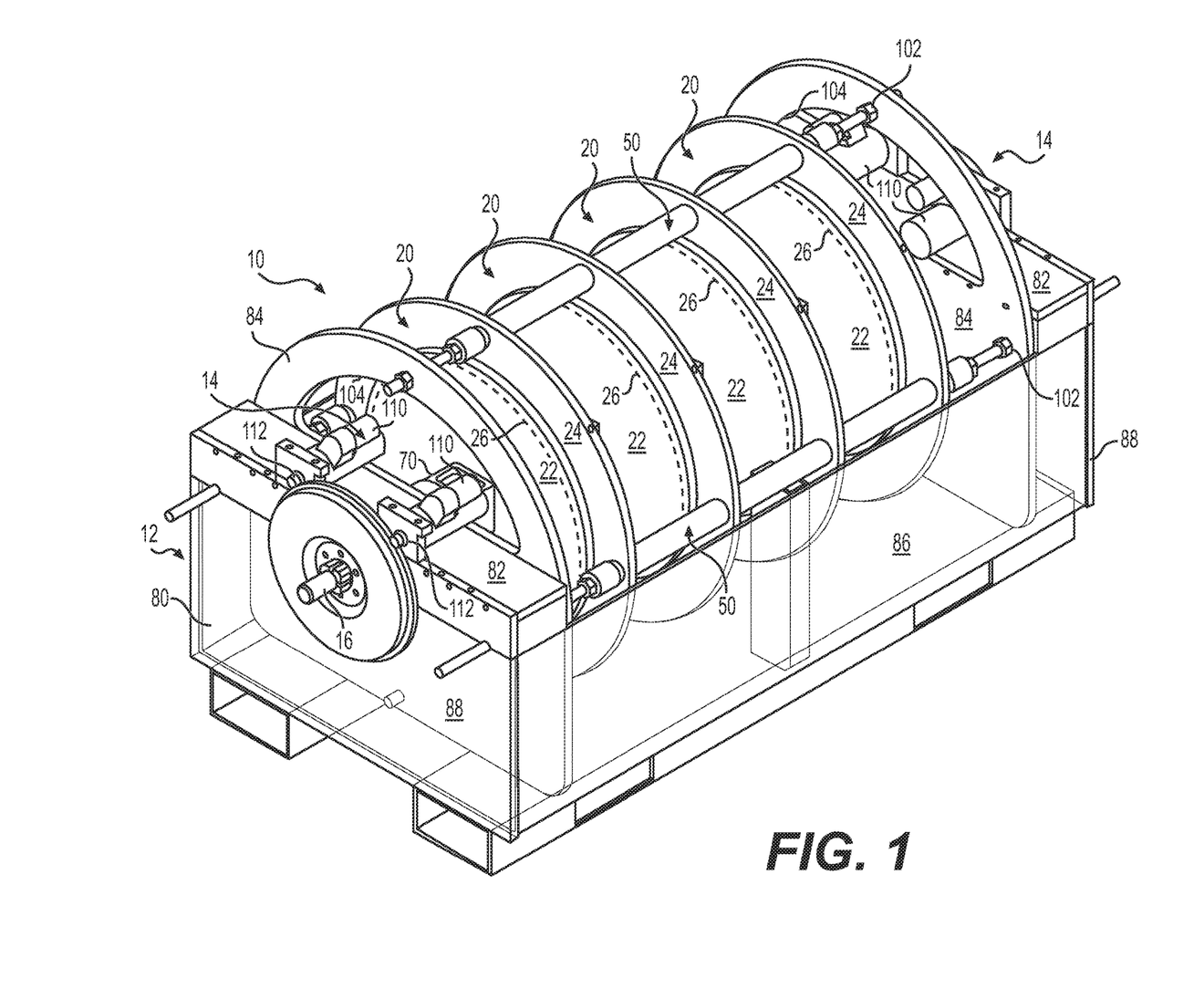
FIG. 1 shows a perspective view of the seal testing system in accordance with the present disclosure.
Figure 2:
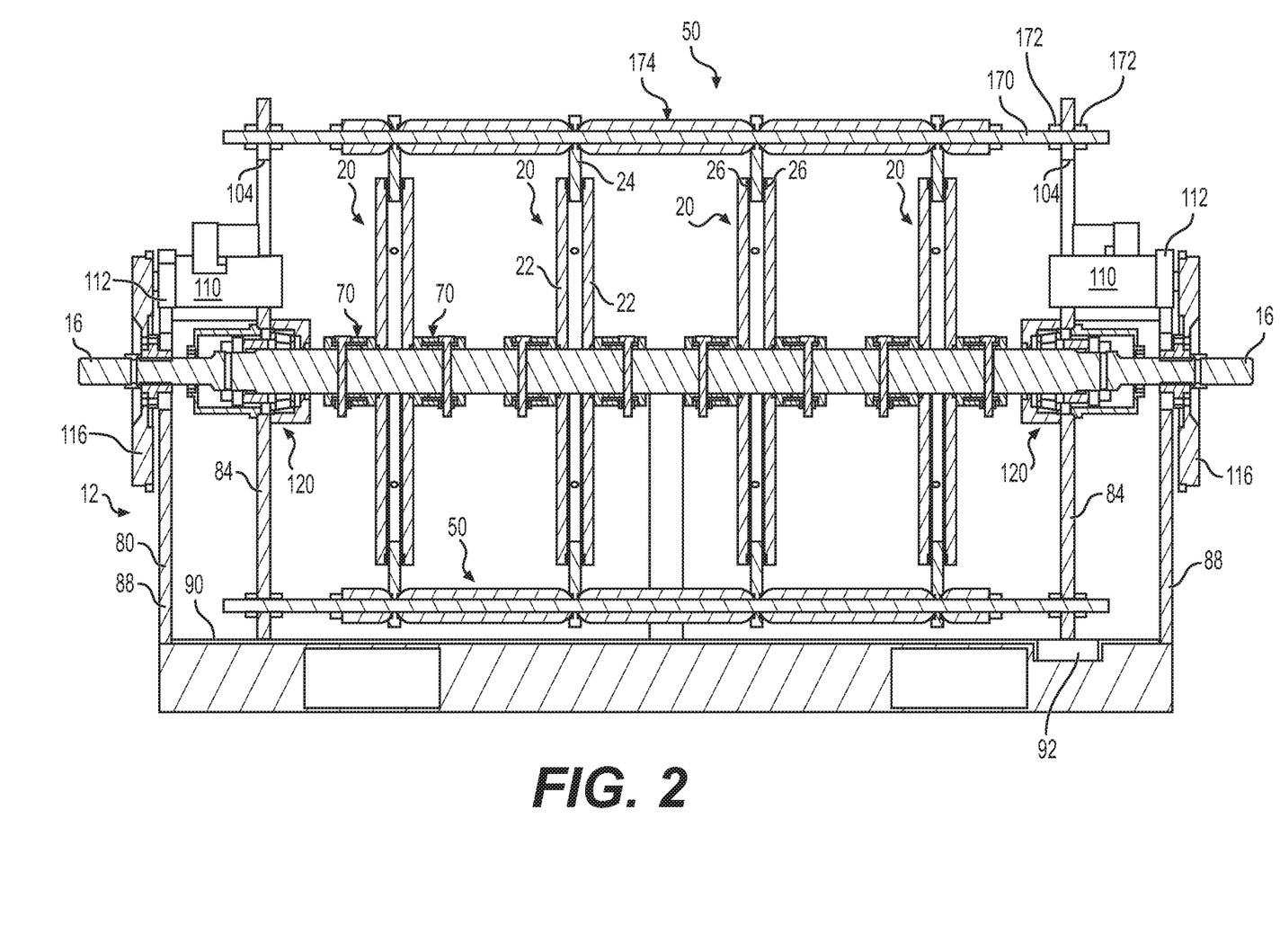
FIG. 2 shows a central cross-sectional view of the seal testing system of FIG. 1.
Figure 4:
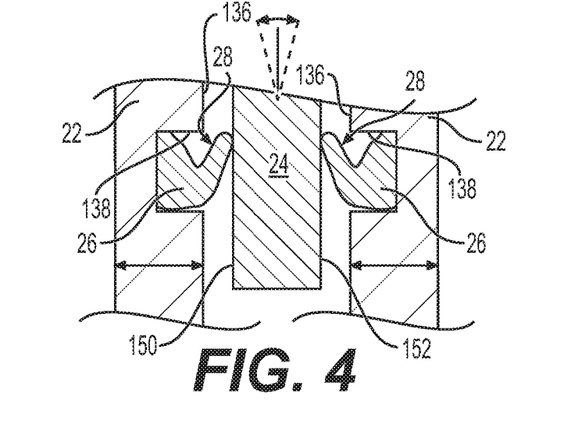
FIG. 4 shows an enlarged view of a seal interface of the seal testing subassembly of FIG. 3.

Referring to FIGS. 1 and 2, a seal testing system 10 includes a housing assembly 12, a drive system 14, a rotatable shaft 16, and a plurality of seal testing subassemblies 20. Each of the seal testing subassemblies 20 may include at least one rotating member 22, a stationary member 24, and at least one test seal 26 located between the rotating member 22 and the stationary member 24 at a seal interface 28 (FIG. 4). The seal testing system 10 may also include a misalignment assembly 50, and gap adjuster assemblies 70 to vary the alignment and gap of the seal interfaces 28.

Figure 10:
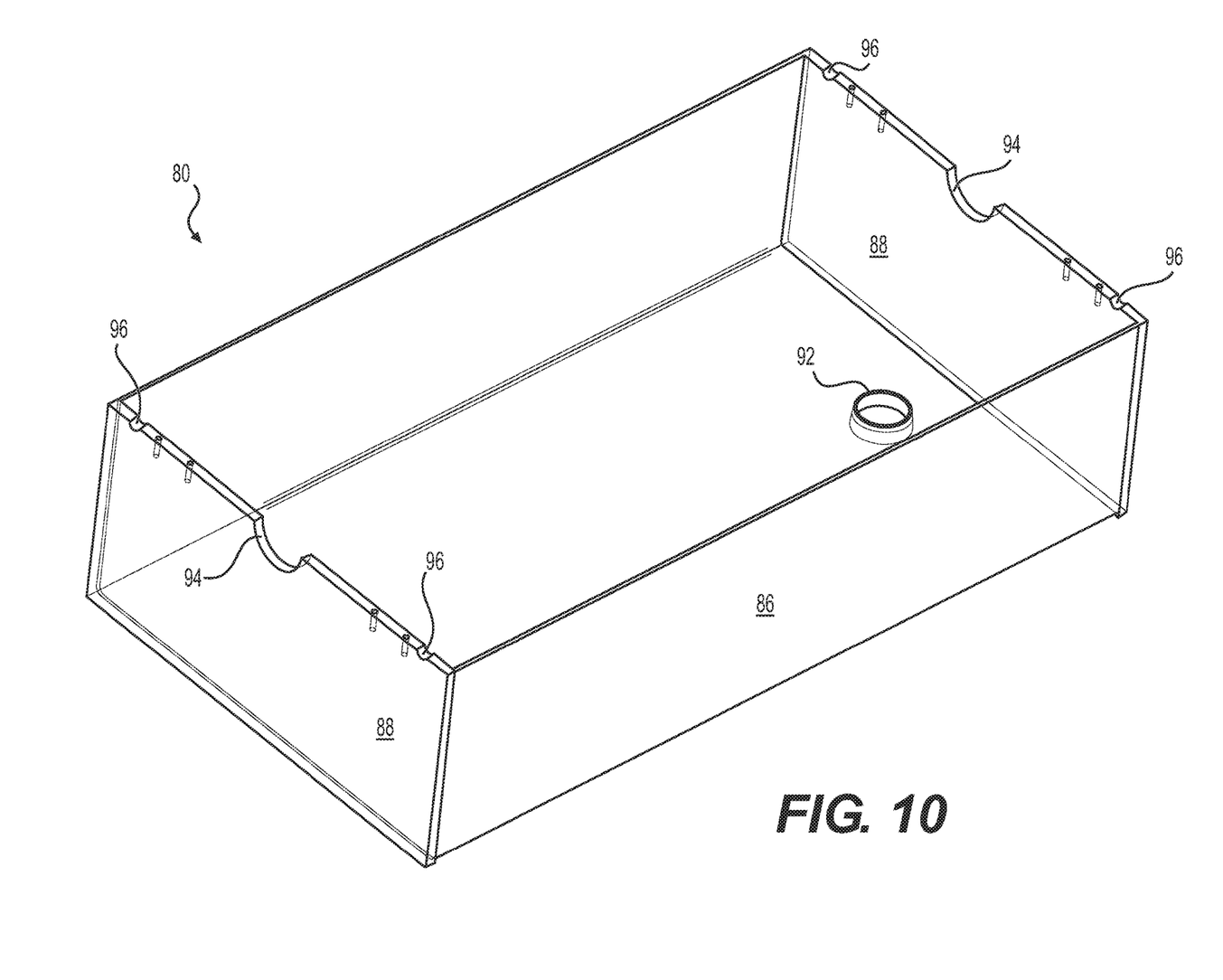
FIG. 10 shows an isolated view the tub of the seal testing system of FIG. 1.

As shown in FIGS. 1, 2, and 10, housing assembly 12 may include a tub 80 (shown isolated in FIG. 10), end caps 82, and a pair of planar support walls 84. Tub 80 may be rectangular in shape having a pair of side walls 86, a pair of end walls 88, a bottom wall 90, and an open top. It is understood that tub 80 could be formed of any appropriate size and shape. As shown, tub 80 only surrounds a bottom half of the seal testing subassemblies 20, however, the tub could surround less, more, or all of seal testing subassemblies 20. Further, while the tub is shown with an open top, it is understood that the tub could form a full enclosure without an open top, or could include a safety cover to protect operators when using the system 10. The bottom wall 90 of tub 80 may include a drain 92. As best seen in FIG. 10, end walls 88 may each include grooves 94 for supporting and positioning rotatable shaft 16, and grooves 96 to support and position portions of misalignment assembly 50.

Referring back to FIGS. 1 and 2, the end caps 82 of housing assembly 12 may be removably secured to the tub 80 and may be configured to help support and secure the drive system 14, rotatable shaft 16, and portions of misalignment assembly 50. The support walls 84 may be located adjacent each end wall 88 and may be sized to be supportably received in tub 80 so that the bottom and sides of support walls 84 contact the bottom wall 90 and side walls 86 of tub 80. Support walls 84 may include four holes 102 (only two can be seen in FIG. 1) positioned to support and secure portions of the misalignment assembly 50. Further, support walls 84 may include a top, semi-circular opening 104 generally aligned with a top surface of end cap 82 to provide extra room for drive system 14. Support walls 84 may be secured in any appropriate way, such a being coupled to end caps 82 via bolts, welds, or the like. It is understood that housing assembly 12 may include additional supports or securing portions, and may be formed of any appropriate material.

Referring back to FIG. 1, drive system 14 may include one or more drive motors 110. For example, seal testing system 10 may include four drive motors 110, two at each longitudinal end of the housing assembly 12 as shown in FIG. 1. However, it is understood that more or less drive motors 110 may be used. The drive motors 110 may be of any conventional type, such as electric drive motors, and may be selectively controlled with respect to both speed and direction. Each drive motor 110 may be secured to a top surface of end caps 82, and may include a geared output shaft 112 for mating with a driven gear 114 at each longitudinal end of rotatable shaft 16. It is understood that other drive couplings could be used instead of gearing. Accordingly, drive motors 110 serve to controllably drive rotatable shaft 16. Further, the number and position of the drive motors 110 allows for switching out of the drive motors 110 without affecting/terminating a particular seal test.

As best shown in FIG. 2, rotatable shaft 16 is supported by, and extends between, end walls 88 and support walls 84 of housing assembly 12. A conventional bearing assembly 120 may be provided at opposite ends of rotatable shaft 16. The bearing assemblies 120 may be coupled to each support wall 84 as shown in FIG. 2 to assist in easier removal of the rotatable shaft 16 from the tub 80. However, it is understood that bearing assemblies 120 could be located at other positions, such as coupled to tub 80, and could be include any conventional type of bearing(s). Rotatable shaft 16 may also be coupled to the plurality of seal testing subassemblies 20, and gap adjuster assemblies 70. As best shown in FIG. 2, the seal testing system 10 may include four identical seal testing subassemblies 20, and eight identical gap adjuster assemblies 70, one on each side of a seal testing subassembly 20. As described herein, reference to a feature of one seal testing subassembly 20 or gap adjuster assembly 70 will be equally applicable to the other, identical, seal testing subassemblies 20 and gap adjuster assemblies 70. More or less seal testing subassemblies 20 and gap adjuster assemblies 70 could be included in seal testing system 10.

Figure 3:
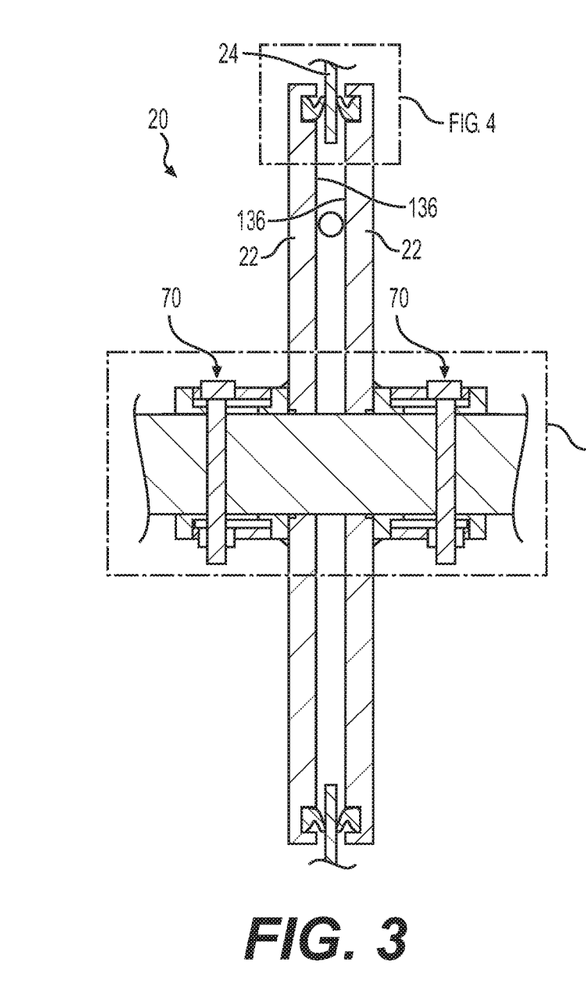
FIG. 3 shows an enlarged view of a seal testing subassembly of the seal testing system of FIG. 1.
Figure 6:
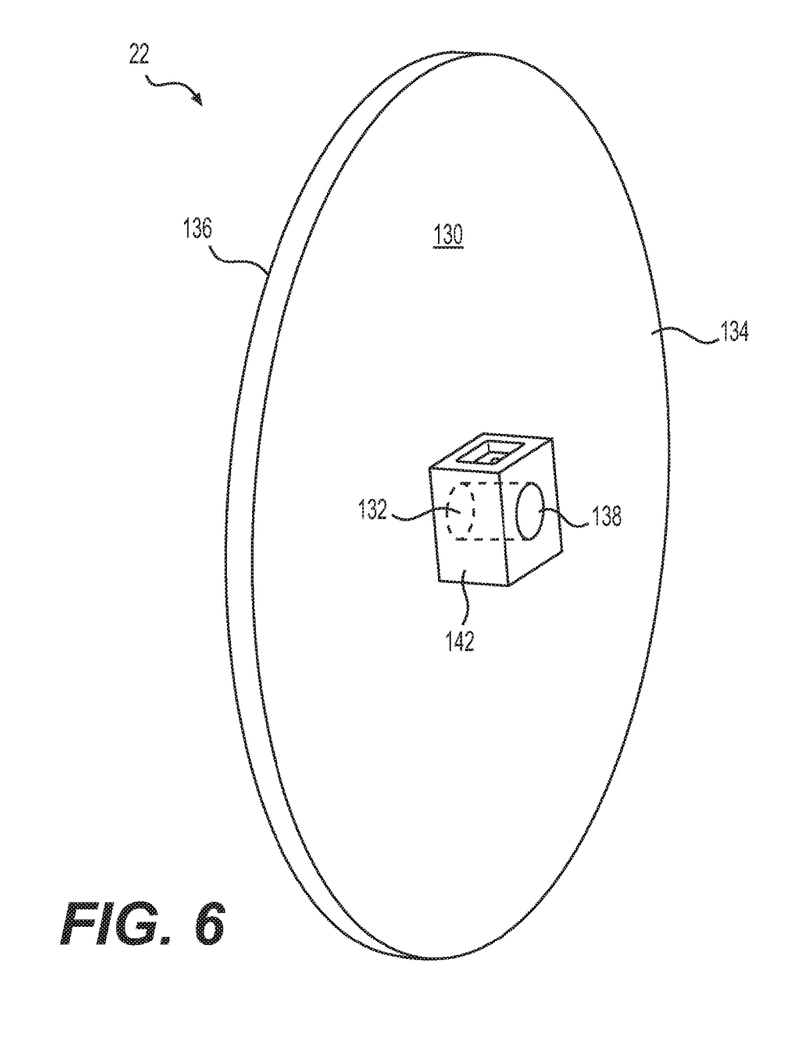
FIG. 6 shows an isolated, perspective view of a rotating member of the seal testing subassembly of FIG. 3.

As best shown in FIG. 3, each seal testing subassembly 20 may include a pair of rotating members 22, one on each of opposite sides of stationary member 24, and an annular test seal 26 disposed between each rotating member 22 and the stationary member 24. Rotating members 22 may be coupled to rotatable shaft 16 via gap adjuster assemblies 70. FIG. 6 depicts a rotating member 22 removed from the seal testing apparatus 10. Rotating member 22 may be formed as a disk member 130 having a generally planar inner face 136, a generally planar outer face 134, and a shaft receiving hole 132 extending therethrough.

Figure 5:
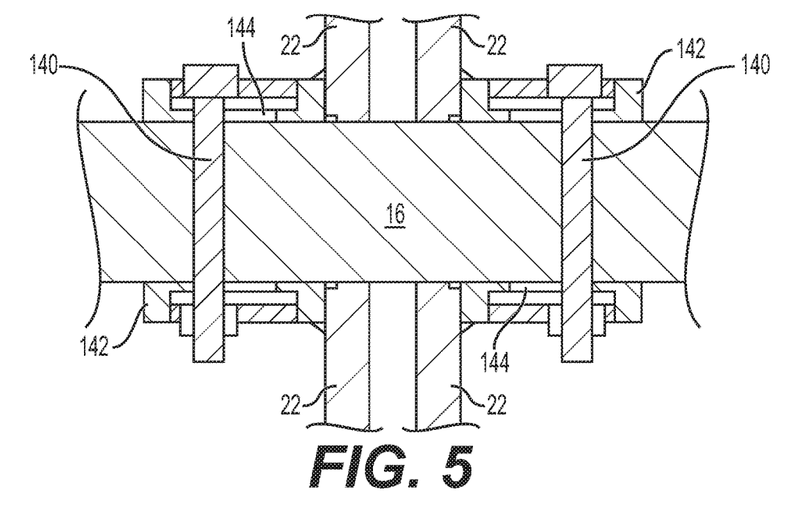
FIG. 5 shows an enlarged side cross-section view of a gap adjuster assembly associated with the seal testing subassembly of FIG. 3.
Figure 7:
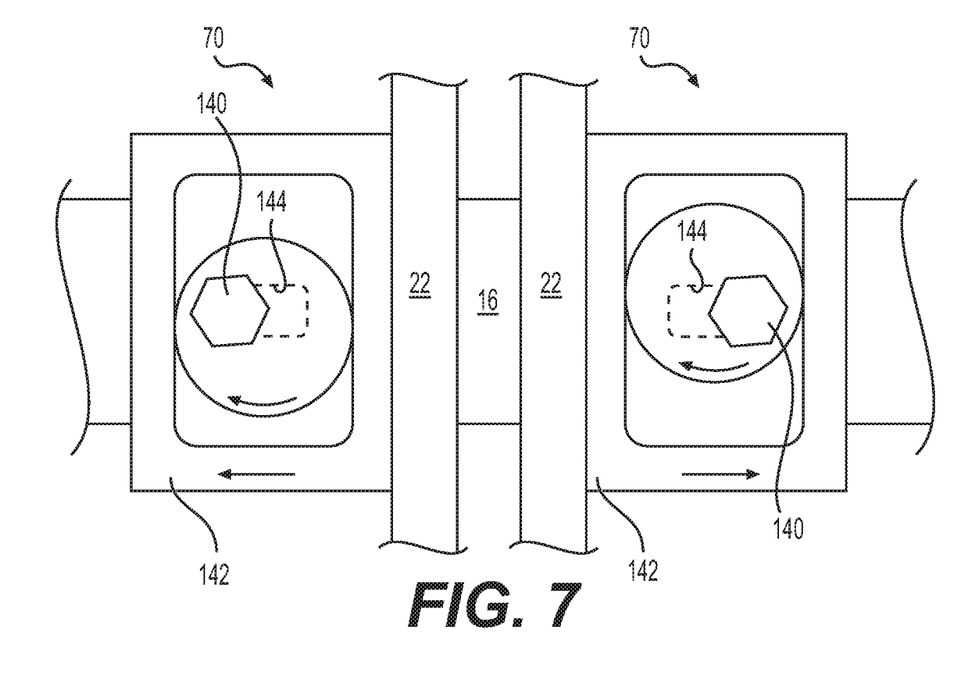
FIG. 7 shows an enlarged top view of the gap adjuster assembly associated with the seal testing subassembly of FIG. 3.

Outer face 134 of disk member 130 may be rigidly connected (e.g. welded) to a gap adjuster housing 142 that also has a shaft receiving hole 138 extending therethrough. As shown in FIGS. 3, 5, and 7 gap adjuster housing 142 is slidably secured to rotatable shaft 16 by a rotatable eccentric adjuster (eccentric bolts 140) extending radially through rotatable shaft 16. In particular, gap adjuster housing 142 includes an inner elongate channel 144 (FIG. 7) such that rotation of the eccentric bolt 140 slides the gap adjuster housing 142 and attached rotating member 22 along the rotating shaft 16 closer and farther away from stationary member 24. Such movement changes the gap or preload at the seal interface 28, as shown by the horizontal arrows in FIG. 4. One or both of eccentric bolt 140 and gap adjuster housing 142 may include markings to readily identify the rotational position of eccentric bold 140, and thus facilitate similar positioning of other eccentric bolt 140 to help obtain similar gap positioning of other rotating members 22.

As best shown in FIGS. 3 and 4, inner face 136 of rotating member 22 includes a circumferential seal receiving groove 138. Seal receiving groove 138 may be any appropriate size and shape to receive the particular seal 26 to be tested. Different rotating members 22 may be machined with different seal receiving grooves 138 to receive different types seal arrangements 26 to allow the seal testing system 10 to test different sizes and types of test seals 26. An exemplary annular lip seal is depicted in FIG. 4. It is understood that while the seal receiving groove 138 is disclosed as provided in the rotating members 22, a seal receiving groove could be provided additionally or alternatively in the stationary member 24. Further, while one seal receiving groove 138 is shown in rotating member 22, it is understood that a rotating member 22 (or stationary member 24) may include two or more seal receiving grooves 138 and test seals 26, for example, radially offset grooves. Rotating members 22 may be formed of any appropriate material, for example, steel.

Figure 8:
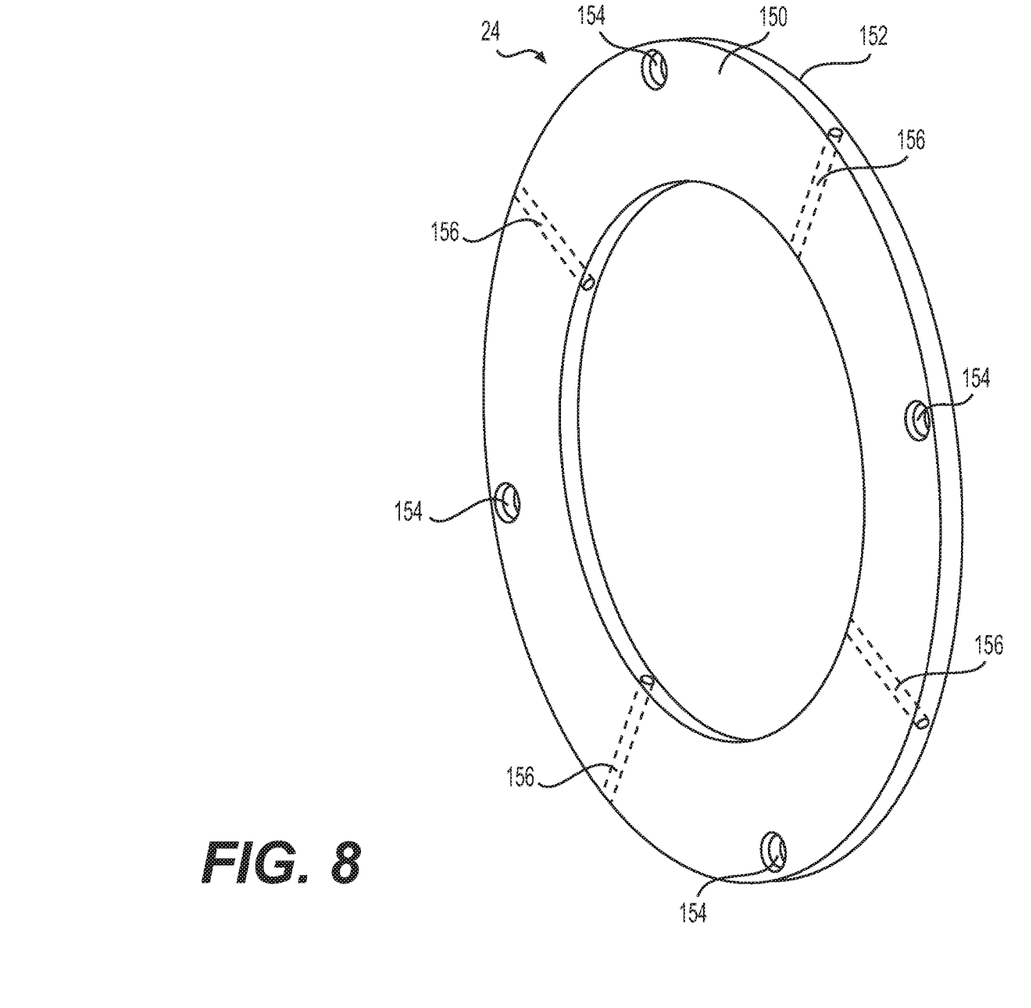
FIG. 8 shows an isolated, perspective view of a stationary member of the seal testing subassembly of FIG. 3.

FIG. 8 depicts stationary member 24 removed from the seal testing system 10. Stationary member 24 may be ring shaped having a pair of generally planar outer faces 150, 152. Stationary member 24 may also include one or more longitudinal holes 154 extending through stationary member 24 at a radially outer portion of the stationary member 24. For example, stationary member 24 may include four holes 154 equally circumferentially spaced around the stationary member 24 (90 degrees apart). Stationary member 24 may also include one or move radially extending holes or bores 156 extending completely through the stationary member 24 from a radially outer edge to a radially inner edge thereof. As shown for example in FIG. 4, the outer surfaces 150, 152 form part of a seal interface 28. As used herein, the seal interface 28 is the general area where test seal 26 contacts stationary member 24, and the associated position of stationary member 24 relative to rotating member 22. Stationary member 24 may be formed of any appropriate material, for example, steel.

Figure 9:
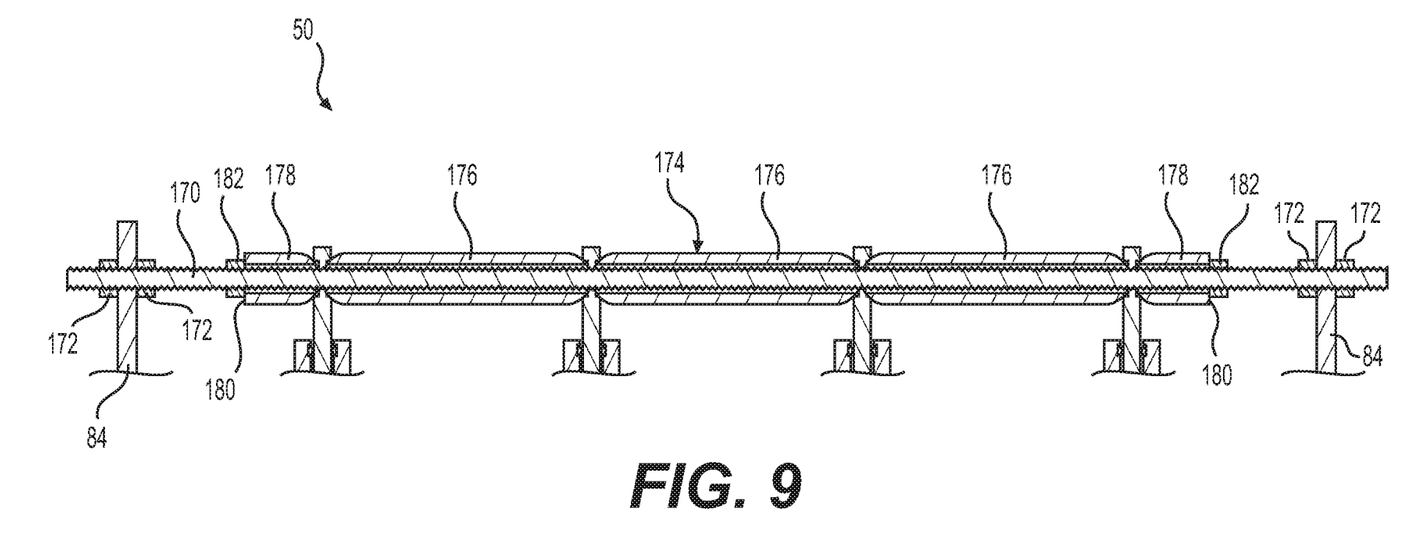
FIG. 9 shows a central cross-section view of a portion of the misalignment assembly of the seal testing system of FIG. 1.

Referring to FIGS. 1, 2, and 9, the misalignment assembly 50 may include one or more misalignment rods 170 extending through one or more holes 154 of the stationary member 24. For example, as shown in the drawings, the misalignment assembly 50 may included four misalignment rods 170 extending through one of each of the four holes 154 of stationary members 24 (FIG. 8) so that the misalignment rods 170 are separated by an arc of 90 degrees. Each misalignment rod 170 may be partially or fully threaded and fixedly secured at opposite ends to support walls 84 of housing assembly 12, for example by a pair of nuts 172 or other fasteners.

A plurality of spacers or spacer group 174 may be provided on misalignment rods 170. For example, spacer group 174 may be movably received on misalignment rods 170 and positioned on both sides of stationary members 24 so as to space each of the stationary members 24 a fixed distance from one another. As shown in the figures, three equally sized intermediate spacers 176 maybe be provided between each of the four stationary members 24. Intermediate spacers 176 may each include spherical ends for proper seating within holes 154 of stationary members 24. An end spacer 178 may be positioned at an outer end of each of the outer-most stationary members 24. As shown, end spacers 178 may include an inner spherical end and an outer planar end 180. The planar ends 180 are configured to abut a positioning nut 182. Coordinated longitudinal movement of both of the positioning nuts 182 along the threads of misalignment rod 170 allows for uniform movement of the spacer group 174 and each of the stationary members 24, and thus can induce a equal misalignment at the seal interface 28 of each seal testing subassembly 20. In one alternative, one or more sized washers can be included between end spacers 178 and the positioning nut 182. Such washers can be added and removed to ensure a standard movement distance of spacer group 174 and stationary member 24. The angular misalignment provided by misalignment assembly 50 is shown by the arc arrow of FIG. 4, and angular misalignments in the order of approximately +/−4 degrees are capable with the disclosed seal testing system 10.

Seal testing system 10 may also include monitoring systems for observing the test seals 26 during testing. One example of a monitoring system may include the use of a camera assembly (not shown), such as a borescope-type camera assembly. One or more camera assemblies may be inserted within the radial bores 156 (FIG. 8) of the stationary members 24 to visually inspect the seal interface 28 or other portions of the seal testing system. Image data from the one or more camera assemblies may undergo an image analysis to determine changes in the test seal 26 over time. Various other monitoring techniques may be used in seal testing system 10, for example one or more dyes could be used in the system to facilitate identification of seal failure.

INDUSTRIAL APPLICABILITY

The disclosed aspects of the present disclosure may be used in the design and testing of seals for use in various machines and environments. For example, the seal testing system 10 may allow for testing the sealing ability and/or life of multiple seals at the same time and under the same environmental and mechanical conditions.

During operation, a test seal 26 may be loaded into each of the seal receiving grooves 138 (FIG. 4) of each seal testing subassembly 20. This can be achieved by, for example, loosening or removing an eccentric bolts 140 from the rotatable shaft 16 to allow rotatable member 22 (and gap adjuster assembly 70) to slide along rotatable shaft 16 and separate from stationary member 24. Once a sufficient gap exists between the stationary member 24 and rotating member 22, the test seal 26 can be loaded into the seal receiving groove 138 of the rotating member 22. This seal loading method assumes that the annular seal 26 has a pair of terminal ends. For an endless annular seal, a more detailed removal of rotating shaft from portions of the housing assembly 12 would be necessary.

Once all of the test seals 26 have been loaded into the seal testing subassemblies 20, eight in total, the gap adjuster assemblies 70 can be checked to ensure that each of the eccentric bolts 140 are rotatably positioned similarly. This will help ensure that all of the seal interfaces 28 include the same gap or preload between the stationary member 24 and the rotating member 22. The tub 80 can be filled with a desired media, such media can take any form, and could be selected to match the media that the test seal 26 will encounter in the field. Such media could include, for example, salt water, fresh water, oil, soil, a slurry, or no media at all. According, the bottom half of the seal testing subassembly will be subject to the media.

Stationary member 24 may be initially positioned by misalignment assemblies 50 to extend generally orthogonal to rotatable shaft 16. However, the stationary members 24 can be moved from the orthogonal orientation to a misaligned orientation to induce a misalignment on test seals 26. Such misalignment movement of stationary member 24 is depicted with the arc arrow at the top of FIG. 4. As discussed above, misalignment can be induced by securing the spacer group 174 at different positions along a misalignment rod 170. For example, a coordinated movement of positioning nuts 182 at both ends of the spacer group 174 will allow the spacer group 174 (and stationary member 24) to slide and be secured at different longitudinal positions along misalignment rod 170. By doing so, each of the stationary members 24 can be moved or deflected while still being constrained by rotating members 22. Different spacer groups 174 on different misalignment rods 170 can be moved different amounts depending on the desired misalignment affects on the test seals 26. For example, an angular misalignment may be induced by moving only two, oppositely positioned spacer groups 174 the same distance, but in opposite directions. Alternatively, an angular misalignment may be induced by movement of only one, or more than one spacer group 174.

Also as discussed above, the gap between the rotating member 22 and the stationary member 24 at the seal interface 28 may be varied by rotation of eccentric bolt 140 of an adjuster assembly 70. Such movement is shown by the horizontal arrows of FIG. 4.

Once all of the variable conditions are set on the seal testing system 10, the seal testing can commence. This may include running one or more drive motors 110 at a desired speed and direction, which will in turn will rotate the rotatable shaft 16, all of the rotatable members 22, and all of the test seals 26. The test seals 26 will provide a seal against stationary member 24. The misalignment assembly 50 also remains stationary.

The seal test assembly 10 of the present disclosure allows for repeatable, lab-based testing of a plurality of the same seals under the same seal wear parameters—the same environmental and mechanical conditions. While the seal testing system 10 may be applicable for final drive annular seals, the seal test assembly can be used with various different types of seals and seal uses. Further, the seal test assembly 10 allows for numerous different conditions to be applied to the seals. For example, the seals can be subject to different media via the tub 80, different alignment/misalignment via the misalignment assembly 50, different seal gaps or preload via the gap adjuster assemblies 70, and different rotating directions and speed profiles via the controllable drive motors 110. Such variable conditions facilitate the mimicking of conditions that the seal will encounter in the field. Thus, the seal test assembly 10 of the present disclosure facilitates accelerated, quantifiable, repeatable, and cost effective seal testing.

The seal test assembly 10 also facilitates monitoring of the test seals by way of a camera assembly (not shown) positionable with the seal testing subassemblies 20 via radial bores 156 extending through the stationary member 24. The seal testing system 10 also facilitates visual inspection of the test seals 26 by the top-open arrangement, ease of access to the test seals 26, and removal of the rotatable shaft 16 and associated components from the tub 80. To that end, the rotatable shaft 16 and seal testing subassemblies 20 can be readily removed from the tub 80 by removing the end caps 82 and connected drive system 14, and lifting the rotatable shaft 16, support walls 84, seal testing subassembly, and misalignment assembly 50 as one unit out of the tub 80. Various other monitoring techniques may be used in seal testing system 10, for example one or more dyes could be used in the system to facilitate identification of seal failure.

It will be apparent to those skilled in the art that various modifications and variations can be made to the disclosed system without departing from the scope of the disclosure. Other embodiments of the system will be apparent to those skilled in the art from consideration of the specification and practice of the lift capacity system disclosed herein. It is intended that the specification and examples be considered as exemplary only, with a true scope of the disclosure being indicated by the following claims and their equivalents.

What is claimed is:

1. A seal testing system, comprising
a drive system;
a rotating shaft driven by the drive system;
a first seal testing subassembly including a first rotating member coupled to the rotating shaft, a first stationary member located adjacent the first rotating member, and a first test seal disposed between the rotating member and the stationary member at a first seal interface;
a second seal testing subassembly including a second rotating member coupled to the rotating shaft, a second stationary member located adjacent the second rotating member, and a second test seal disposed between the rotating member and the stationary member at a second seal interface; and
a misalignment assembly coupled to the first and second stationary members to move the first and second stationary members the same distance to provide an equal misalignment at the first and second seal interface.

2. The seal testing system of claim 1, further including a first gap adjustment assembly associated with the first seal testing subassembly, and a second gap adjustment assembly associated with the second seal testing subassembly, the first and second gap adjustment assemblies selectively adjusting a gap of the first and second seal interfaces.

3. The seal testing system of claim 2, wherein the first and second gap adjustment assemblies include a rotatable eccentric adjuster.

4. The seal testing system of claim 1, further including a tub for holding media, and at least a portion of the first and second seal interface is located in the tub.

5. The seal testing system of claim 1, wherein the drive system is selectively controllable with respect to at least one of speed and direction.

6. The seal testing system of claim 1, wherein first and second stationary members are identical ring members.

7. The seal testing system of claim 6, wherein first and second rotating members are identical member and each includes a seal grove for receiving the first and second test seals, respectively.

8. The seal testing system of claim 1, further including at least one bore extending through the first stationary member, and a camera assembly extending through the bore.

9. The seal testing system of claim 1, wherein the first seal testing subassembly includes at least two test seals, and the second seal testing subassembly includes at least two test seals.

10. A seal testing system, comprising
a tub for holding media;
a drive system;
a rotating shaft driven by the drive system;
a first seal testing subassembly including a first rotating member coupled to the rotating shaft, a first stationary member located adjacent the first rotating member, and a first test seal disposed between the rotating member and the stationary member at a first seal interface, the first seal interface being at least partially located in the tub;
a gap adjustment assembly associated with the first seal testing subassembly, the gap adjustment assembly adjusting a gap of the first seal interface with a rotatable eccentric adjuster; and
a second seal testing subassembly substantially identical to the first seal testing subassembly, the second seal testing subassembly including a second rotating member coupled to the rotating shaft, a second stationary member located adjacent the second rotating member, and a second test seal disposed between the rotating member and the stationary member at a second seal interface, the second seal interface being at least partially located in the tub.

11. The seal testing system of claim 10, further including a misalignment assembly coupled to the first and second stationary members to move the first and second stationary members the same angular distance to provide an equal angular misalignment at the first and second seal interface.

12. The seal testing system of claim 10, wherein the gap adjustment assembly is a first gap adjustment assembly, and the seal testing system further includes a second gap adjustment assembly associated with the second seal testing subassembly, the second gap adjustment assembly selectively adjusting a gap of the second seal interface.

13. The seal testing system of claim 10, wherein the drive system is selectively controllable with respect to speed and direction.

14. The seal testing system of claim 10, further including at least one bore extending through the first stationary member, and a camera assembly extending through the bore.

15. The seal testing system of claim 10, wherein the first seal testing subassembly includes at least two test seals, and the second seal testing subassembly includes at least two test seals.

\* \* \* \* \*